(12) United States Patent
Ekholm

(10) Patent No.: US 11,873,612 B2
(45) Date of Patent: *Jan. 16, 2024

(54) SCREEN INTAKE FLOW CONTROL AND SUPPORT DEVICE

(71) Applicant: Aqseptence Group, Inc., New Brighton, MN (US)

(72) Inventor: Michael R. Ekholm, Minneapolis, MN (US)

(73) Assignee: JOHNSON SCREENS, INC., New Brighton, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,054

(22) Filed: Feb. 26, 2019

(65) Prior Publication Data

US 2019/0390428 A1    Dec. 26, 2019

Related U.S. Application Data

(63) Continuation of application No. 13/117,405, filed on May 27, 2011, now Pat. No. 10,214,871.

(51) Int. Cl.
*E02B 9/04* (2006.01)
*B01D 35/157* (2006.01)
(Continued)

(52) U.S. Cl.
CPC ........... *E02B 9/04* (2013.01); *B01D 29/33* (2013.01); *B01D 29/48* (2013.01); *B01D 29/54* (2013.01);
(Continued)

(58) Field of Classification Search
CPC .................................. E02B 5/08; E02B 9/04
See application file for complete search history.

(56) References Cited

U.S. PATENT DOCUMENTS 2,754,003 A   7/1956 Fenner
3,887,718 A   6/1975 Hinds
(Continued)

FOREIGN PATENT DOCUMENTS

DE  29606945        8/1996
EP  1818089 A1      8/2000
WO  WO 03/014481 A1 2/2003

OTHER PUBLICATIONS

U.S. Appl. No. 13/117,405, Notice of Allowance dated Jun. 26, 2018. (Year: 2019).*

(Continued)

*Primary Examiner* — Jonathan M Peo
(74) *Attorney, Agent, or Firm* — Patterson, Thuente PA

(57) ABSTRACT

A screen intake has a central body with two screens attached on either end. Each of the screens has an interior that communicates with a hollow of the body via flow modifiers. These flow modifiers include one or more pipes disposed in the interior of the screens and through passages in ends of the body. A flow control support device disposed within the body supports the body's sidewall and divides the hollow into at least two portions—each communicating with flow from one of the flow modifiers. The device can include one or more plates disposed adjacent one another within the internal hollow with a peripheral edge attached to an inside of the body's sidewall. At least one of the one or more plates can be solid, or one or more of the plates can define openings therein allowing passage of at least some fluid therethrough.

20 Claims, 2 Drawing Sheets

(51) Int. Cl.
*B01D 29/33* (2006.01)
*B01D 29/48* (2006.01)
*B01D 29/54* (2006.01)
*B01D 29/90* (2006.01)
*E03B 3/04* (2006.01)

(52) U.S. Cl.
CPC ....... *B01D 29/902* (2013.01); *B01D 35/1576* (2013.01); *E03B 3/04* (2013.01); *B01D 2201/44* (2013.01); *Y02E 10/20* (2013.01)

(56) References Cited

U.S. PATENT DOCUMENTS

| | | | |
|---|---|---|---|
| 3,898,164 A * | 8/1975 | Hsiung | B01D 21/0063 210/521 |
| 4,162,219 A | 7/1979 | Miropolsky | |
| 4,400,280 A * | 8/1983 | Larsson | B01D 17/0208 210/802 |
| 4,729,828 A | 3/1988 | Miller | |
| 5,670,039 A | 9/1997 | Harris | |
| 6,051,131 A * | 4/2000 | Maxson | B01D 29/114 210/162 |
| 10,214,871 B2 * | 2/2019 | Ekholm | B01D 35/1576 |
| 2004/0065614 A1 | 4/2004 | Gordon et al. | |

OTHER PUBLICATIONS

U.S. Appl. No. 13/117,405, Office Action, dated Dec. 21, 2016. (Year: 2019).*
"Innovative Solutions in Screen Technology," by Johnson Screens, a Weatherford Company; obtained from www.johnsonscreens.com, © 2006, JS-BR5313-0505 WFT4371.00, 12 pages.
Australian Office Examination Report for Australian Application No. 2012202612, dated Aug. 26, 2013, 3 pages.
European Extended Search Report for European Patent Application No. 121169647.0, dated Feb. 4, 2013, 5 pages.
Canadian Office Action for Canadian Application No. 2,776,660 dated Apr. 30, 2013, 2 pages.

* cited by examiner

SCREEN INTAKE FLOW CONTROL AND SUPPORT DEVICE

CROSS-REFERENCE TO RELATED APPLICATIONS

This application is a continuation of application Ser. No. 13/117,405, filed May 27, 2011, now U.S. Pat. No. 10,214,871, issued Feb. 26, 2019, which is hereby fully incorporated herein by reference.

BACKGROUND

Manufacturing plants, irrigation systems, and power generation facilities use large quantities of water for their operation. To collect the water, screen intakes are used in various bodies of water. One common type of screen intake has a tee configuration with two screens on opposing ends. The screen intakes must be designed to protect aquatic life and to prevent buildup of debris along the length of the intake's screens. To do this, the flow velocity through the screens should be kept below a maximum peak level, which may be about 0.5 f/s. One way to reduce the flow resistance and control the flow velocity at the screen's surface is to use flow modifiers inside the screen intake. For example, Johnson Screens—the assignee of the present disclosure—improves flow uniformity using flow modifiers as disclosed in U.S. Pat. No. 6,051,131, which is incorporated herein by reference in its entirety.

When used, the screen intakes may also be installed in applications subjecting the intake to external pressures and impact loads. Likewise, fluid passing through the screen intake may experience pressure drops and additional flow resistances that reduce the flow capacity of the screen intake. What is needed is a screen intake that not only has the advantages of uniform flow velocity at the screen's surface, but that further reduces flow resistances within the intake and strengthens the structural support of the intake to resist external pressures and impact loads.

BRIEF DESCRIPTION OF THE DRAWINGS

Subject matter hereof may be more completely understood in consideration of the following detailed description of various embodiments in connection with the accompanying figures, in which.

Figure 1A:
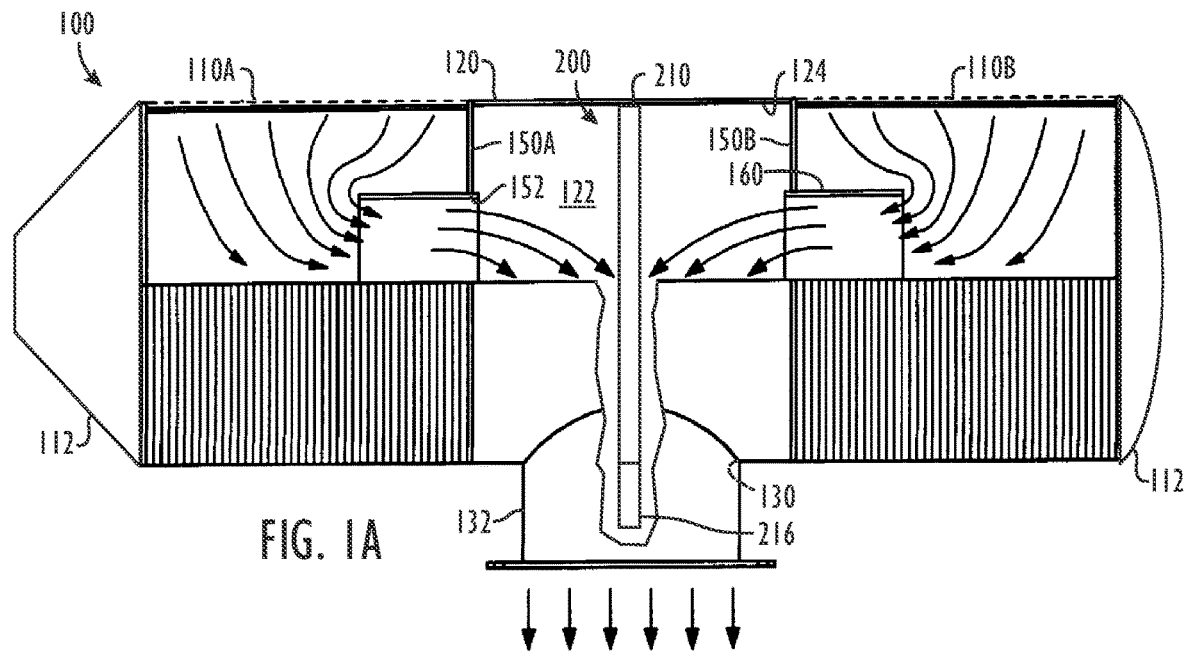
FIG. 1A illustrates a partial cross-section of a screen intake having a tee configuration, single tubular flow modifiers, and a flow control support device.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1B:
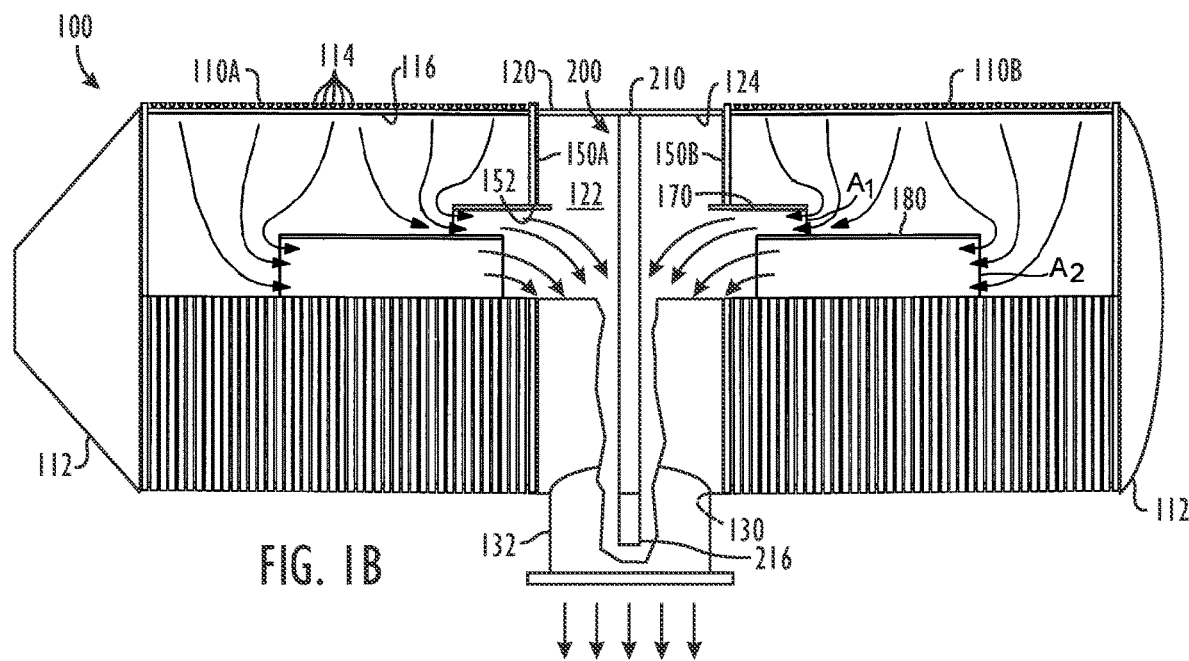
FIG. 1B illustrates a partial cross-section of a screen intake having a tee configuration, dual tubular flow modifiers, and a flow control support device.

A screen intake 100 illustrated in FIGS. 1A-1B has a tee configuration and has first and second screens 110A-B connected on opposing ends of a central body 120. The central body 120 defines a hollow 122 therein and has a cylindrical sidewall 124 and opposing end walls 150A-B. An outlet 130 in the sidewall 124 connects by a conduit 132 to other components of a fluid intake system (not shown). Both end walls 150A-B have a central opening 152 receiving flow from one of the screens 110A-B.

Both screens 110A-B have open ends connected to the body's end walls 150A-B and have closed ends caps 112 that may be shaped to deflect debris. Each of the screens 110A-B is cylindrical in shape and defines a plurality of slots for entry of water into the screen 110A-B. The slots can be either transverse or parallel to the axis of the screen 110A-B. Preferably, spaced wraps of profiled wire 114 form the slots on the cylindrical surfaces of the screens 110A-B, although the screens 110A-B can also be a solid pipe member with slots formed therein. The profiled wire 114 is preferably wedged or Vee-shaped with a wider base of the wire 114 facing outward to enhance the sliding of debris over the screens' surfaces. For example, the profiled wire 114 can be VEE-WIRE® available from Johnson Screens. (VEE-WIRE is a registered trademark of Weatherford/Lamb, Inc.). In one implementation and as shown in FIG. 1B, a plurality of these profiled wires 114 are circumferentially wrapped and welded to inner support bars 116 to form the screens 110A-B using techniques known in the art.

The central passages 152 in the end walls 150A-B may be sufficient to control the flow velocity at the screen's surfaces so as to maintain a preferred surface flow velocity. However, each end wall 150A-B preferably has a flow modifier disposed in its central opening 152 to further control the flow velocity. In general, the screen intake 100 can use flow modifiers having one or more pipes disposed in the openings 152 and partially inside the screens 110A-B to communicate fluid from inside the screens 110A-B, through the openings 152 in the end walls 150A-B, and into the hollow 122 of the central body 120. For example, the intake 100 embodied in FIG. 1A uses single flow pipes 160 for the flow modifier disposed in the openings 152, while the intake 100 embodied in FIG. 1B uses double flow pipes 170 and 180 nested inside one another in the openings 152.

The screen intake 100 and flow modifiers are designed to reduce the entrance velocity at the screens' slots to about 0.135 m/s or 0.5 f/s. Such a lower entrance velocity protects surrounding aquatic life and prevents debris clogging. Designers configure the lengths, diameters, flow areas, and other variables of the flow modifiers' pipes 160 and 170/180 to keep the average flow through the screens' surfaces as close to the allowable peak flow velocity and as uniformly distributed across the screens' surfaces as possible. Where the flow modifier uses two pipes 170/180 as in FIG. 1B, for example, the larger diameter pipe 170 may be about 50% of the screen 110's diameter and may be about 16% of the length of the screen 110. The smaller diameter pipe 180 nested within the outer pipe 170 may have a diameter about 70% that of the outer pipe 170 and may have a length which extends about 67% of the length of the screen 110. Further details of the design of the flow modifiers are disclosed in U.S. Pat. No. 6,051,131, which is incorporated herein in its entirety.

Although effective with the flow modifiers alone, the screen intake 100 of FIGS. 1A-1B also includes a flow control support device 200 disposed within the central body 120 and dividing the hollow 122 into at least two separate portions. As shown in FIGS. 1A-1B, the flow control support device 200 includes a solid plate 210 that divides the hollow 122 into two separate portions. A first of the hollow's portions communicates with flow from the first screen 110A via the flow modifiers (pipe 160 or pipes 170/180), and a second of the hollow's portions communicates with the fluid from the second screen 110B via the flow modifiers (pipe 160 or pipes 170/180). In this way, the plate 210 can control the fluid flow merging inside the hollow body 120 from the first and second screens 110A-B and can reduce turbulence in the merged fluid flow as it is directed to the outlet.

Figure 2A:
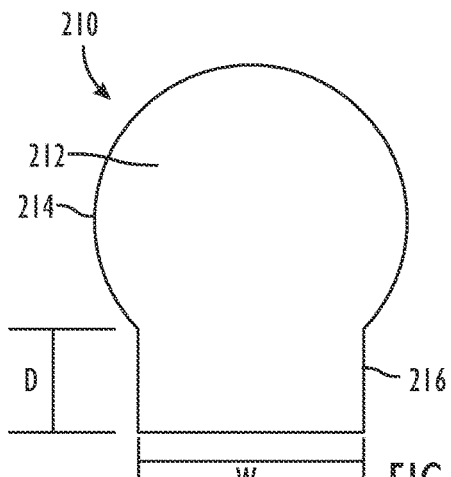
FIG. 2A illustrates a frontal view of a solid plate for a flow control support device.

The plate 210 shown in frontal view in FIG. 2A has a solid face 212 and a peripheral edge 214. When disposed in the hollow body (120), this peripheral edge 214 attaches to the inside of the hollow body's sidewall (124) by welding, bracketing, or the like either continuously or partially around the edge 214. In this way, the plate 210 attached to the sidewall (124) internally supports the hollow body (120) against internal and external pressures and impact loads.

The plate 210 can also have a tab 216 that extends from the peripheral edge 214. As shown in FIGS. 1A-1B, this tab 216 disposes through the outlet 130 of the hollow body 120 and partially into the conduit 132 connected to the outlet 130. As shown in FIG. 2A, the width W of this tab 216 can be the same as the size of the outlet (130), and the tab 216 can extend a distance D within the outlet's conduit (132). The distance D can be configured for a particular implementation and may depend on the fluid flow rates, the type of fluid, the size of the outlet, the number of plates used, the size of the screen intake, and other factors evident to one skilled in the art with the benefit of the present disclosure.

Figure 2B:
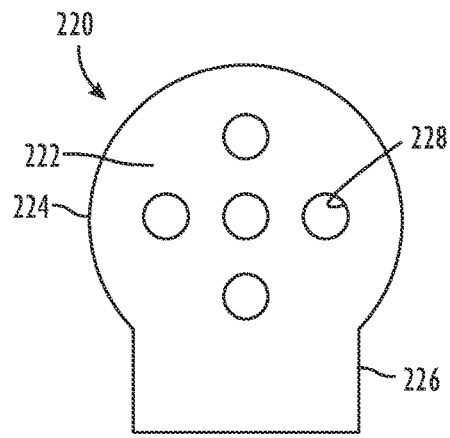
FIG. 2B illustrates a frontal view of a perforated plate for a flow control support device.

Although the flow control support device 200 in FIGS. 1A-1B uses the solid plate 210 as shown, a partial plate or a perforated plate having one or more holes, slots, openings, or the like can also be used. For example, a perforated plate 220 illustrated in FIG. 2B has a central body 222, a peripheral edge 224, and a tab 226—each of which can be essentially the same as the solid plate 210 of FIG. 2A. In the central body 222, however, the perforated plate 220 has one or more openings 228 allowing at least some passage of fluid through the plate 220. These openings 228 can be circular holes, rectilinear slots, elongated slits, or other appropriate shape. Moreover, these openings 228 can be arranged symmetrically or randomly in the central body 222. In general, the number, size, and shape of these openings 228 may be based in part on the particular implementation in which the plate 220 is used, including considerations of the type of fluid, desired flow rates, number of plates (perforated or not) used, size of the screen intake, etc.

Figure 3A:
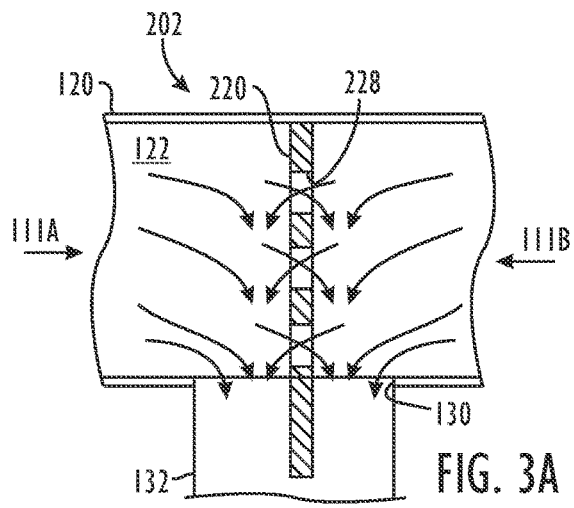
FIG. 3A illustrates a flow control support device having a single perforated plate installed in the screen intake's hollow body.

As shown in FIG. 3A, a flow control support device 202 installed in the hollow body 120 can include one such perforated plate 220 alone. Fluid flows 111A-B from the opposing screens (not shown) meet at the perforated plate 220 to be directed to the outlet 130. The plate's openings 228, however, permit at least some of the flow 111A-B to intermix with opposing flow on the other side of the plate 220 as the flow impinges toward the plate 220 and passes through the openings 228.

Figure 3B:
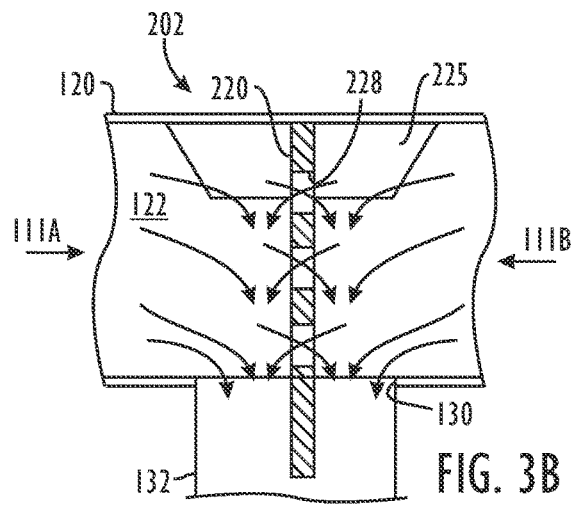
FIG. 3B illustrates a flow control support device having a single perforated plate and longitudinal modifier installed in the screen intake's hollow body.

As shown in FIG. 3B, the flow control support device 202 installed in the hollow body 120 can also include one or more longitudinal modifiers 225 arranged relative to the plate 220. These one or more longitudinal modifier 225 can be dispose around the inside of the hollow body 120 in any desirable manner, and they can extend into the body 120 to any desirable extent, depending on the implementation.

Figure 4:
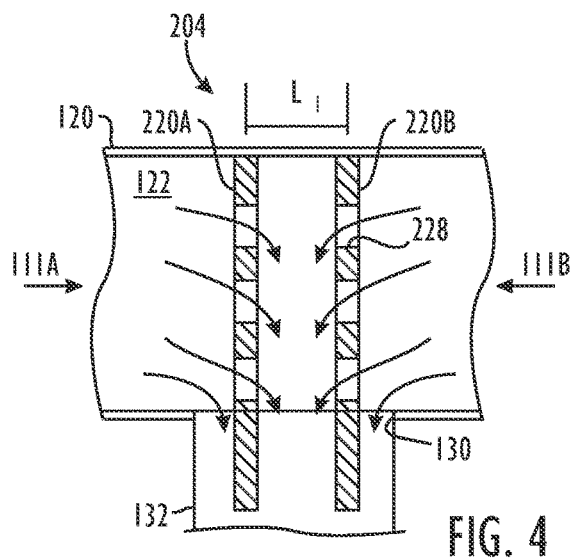
FIG. 4 illustrates a flow control support device having multiple perforated plates installed in the screen intake's hollow body.

As shown in FIG. 4, another flow control support device 204 installed in the hollow body 120 can include two such perforated plates 220A-B. Although two plates 220A-B are shown, more than two perforated plates 220 could also be installed in the hollow body 120 in other implementations. These two perforated plates 220A-B are positioned adjacent one another in the hollow body 120, essentially dividing the body's hollow 122 into two portions with a central area between the plates 220A-B. Fluid flows 111A-B from the opposing screens (not shown) meet each of the perforated plates 220 to be directed to the outlet 130. Here, the plate's openings 228 permit at least some of the opposing flow 111A-B to intermix in the central space between the plates 220A-B to be directed to the outlet 130.

As shown in FIG. 4, the openings 228 in the adjacent plates 220A-B can be aligned with one another. Depending on the implementation, however, the openings 228 may be offset from one another so they do not align. As also shown, these two perforated plates 220A-B are separated by a distance $L_1$, which like the number, size, and other features of the openings 228, may be configured for a particular implementation depending on the various considerations detailed herein. Moreover, although both plates 220A-B are perforated, one of the plates could be a solid plate or a partial plate, for example, depending on the direction of flow outside the intake.

Figure 5:
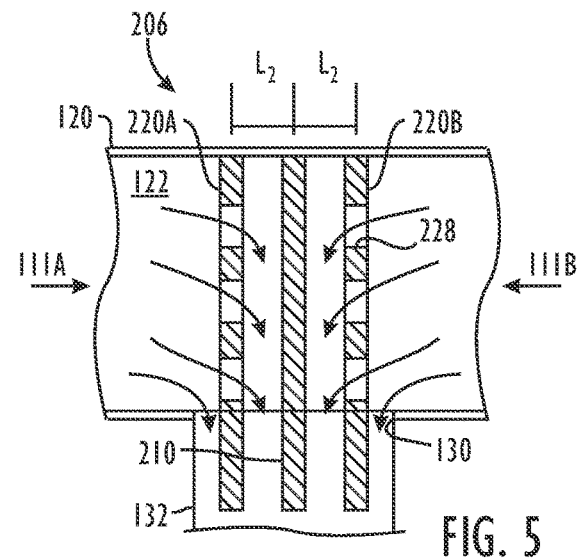
FIG. 5 illustrates a flow control support device having a solid plate and multiple perforated plates installed in the screen intake's hollow body.

In yet another alternative shown in FIG. 5, a flow control support device 206 installed in the hollow body 120 can include a solid plate 210 and two or more perforated plates 220A-B disposed adjacent one another in the hollow body 120. As shown, the central plate of the arrangement is the solid plate 210, and the two outside plates on either side of the central plate 210 are perforated plates 220A-B having openings 228 therein. Although two perforated plates 220A-B are shown on either side of the central plate 210, more than two perforated plates 220 could be positioned on each side of the central plate 210. The openings 228 in the perforated plates 220A-B allow for some flow 111A-B to pass through these plates 220A-B to be controlled by the next plate in the flow path. The central plate 210, although shown as being solid, could itself include one or more openings as well.

Again, these plates 210 and 220A-B are positioned adjacent one another in the hollow body 120, essentially dividing the body's hollow 122 into two portions. Thus, fluid flows 111A-B from the opposing screens (not shown) meet each of the perforated plates 220A-B to be directed to the outlet 130. The plate's openings 228 permit at least some of the flow 111A-B to pass in between the plates 220A-B and the central plate 210 to be directed to the outlet 130. As shown, these plates 210 and 220A-B are separated by a distance $L_2$, which like other features of the plates 210/220A-B, may be configured for a particular implementation depending on the various considerations detailed herein.

As noted previously, the flow modifiers of pipes 160 and 170/180 are typically used in the screens 110A-B to control velocity at the screen's surface. The flow control support devices 200-206 disclosed herein address the flow after the fluid passes through the flow modifiers. Therefore, the devices 200-206 act on the area of greatest pressure drop or flow resistance inside the screen intake 100 by controlling the merging flow 111A-B from the two screens 110A-B and reducing turbulence or swirling flow that may develop inside the screen intake 100. In addition, the devices 200-206 help to support the structural resistance of the intake 200 by reinforcing the central body's sidewall 124. Furthermore, the support from the plates 210/220 may allow the sidewall 124 to have a smaller thickness may eliminate the need for additional reinforcement to reduce the potential of collapse.

The foregoing description of preferred and other embodiments is not intended to limit or restrict the scope or applicability of the inventive concepts conceived of by the Applicants.

Features on one embodiment can be combined with features of another embodiment, as will be appreciated with the benefit of the present disclosure. Moreover, the embodiments have been shown as being symmetrical, but this is not strictly necessary. For example, the plate(s) (e.g., 210 and/or 220) do not need to be in the center of the hollow body 120. Instead, the position of the plate(s) can be different, especially if the screen intake 100 is asymmetric (i.e., one cylindrical end is longer than the other).

Although the disclosed flow control and support device has been disclosed for use in screen intakes having flow modifiers of one or more pipes, the device could be used in a screen intake that lacks pipes and simply uses flow passages in the end walls of the central body that allows flow from the interior of the screens to enter the hollow of the central body. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A screen intake, comprising:
a hollow body defining a longitudinal axis, the hollow body including a sidewall defining first and second ends wherein the first and second ends are opposing ends, the hollow body further including a single outlet in the sidewall;
a first screen mounted on the first end;
a second screen mounted on the second end; and
at least one internal plate disposed within the hollow body, the at least one internal plate extending toward the single outlet to define a first hollow portion and a second hollow portion within the hollow body,
wherein said hollow body is submerged in a fluid flow,
wherein a first fluid flow is filtered through the first screen and is directed into the first hollow portion and toward the at least one internal plate,
wherein a second fluid flow is filtered through the second screen and is directed into the second hollow portion and toward the at least one internal plate in a direction opposed from the first fluid flow, and
wherein the at least one internal plate is adapted to merge the first fluid flow and the second fluid flow to form a merged fluid flow, said merged fluid flow being directed to the single outlet.

2. The screen intake of claim 1, wherein the first screen and the second screen each comprise a screen sidewall, a closed distal end, and an open proximal end, the open proximal end attached to one of the opposing ends of the hollow body, wherein the screen sidewall is cylindrical.

3. The screen intake of claim 1, wherein the first hollow portion includes a first pipe and the second hollow portion includes a second pipe, the first and second pipe each having an open distal end disposed to receive the first fluid flow from the first screen and the second fluid flow from the second screen respectively, the first and second pipe each having an open proximal end disposed in the first hollow portion and the second hollow portion respectively.

4. The screen intake of claim 1, wherein the first hollow portion includes first double pipes and the second hollow portion includes second double pipes, the first double pipes and the second double pipes each comprise a first pipe disposed inside a second pipe, the first double pipes and the second double pipes each having an open distal end disposed to receive the first fluid flow from the first screen and the second fluid flow from the second screen respectively and the first double pipes and the second double pipes each having an open proximal end disposed in the first hollow portion and the second hollow portion respectively.

5. The screen intake of claim 1, wherein the at least one internal plate extending toward the single outlet comprises a first plate being solid and having a peripheral edge attached at least partially to an inside of the sidewall of the hollow body.

6. The screen intake of claim 5, wherein the first plate comprises a tab extending radially from the peripheral edge and disposed through the single outlet of the hollow body.

7. The screen intake of claim 6, wherein the tab extends a length into a conduit coupled to the single outlet.

8. The screen intake of claim 1, wherein the at least one internal plate extending toward the single outlet comprises two or more plates disposed adjacent one another in the hollow body, at least one of the two or more plates defining one or more openings therein.

9. The screen intake of claim 1, wherein the at least one internal plate extending toward the single outlet comprises two or more plates disposed adjacent one another in the hollow body, each of the two or more plates defining one or more openings therein.

10. The screen intake of claim 1, wherein the at least one internal plate extending toward the single outlet comprises a central plate and at least one first plate disposed adjacent one side of the central plate, and at least one second plate disposed adjacent another side of the central plate, wherein each of the at least one first and second plates define one or more openings therein.

11. The screen intake of claim 10, wherein the central plate also defines one or more central plate openings therein.

12. A method of reducing flow turbulence in a submerged screen intake comprising:
filtering a first fluid flow through a first screen mounted on a first end of the submerged screen intake, the first fluid flow entering a hollow interior of the submerged screen intake;
filtering a second fluid flow through a second screen mounted on a second end of the submerged screen intake, the second fluid flow entering the hollow interior from a direction opposite the first fluid flow;
merging the first fluid flow and the second fluid flow using at least one internal plate extending toward a single outlet, the at least one internal plate disposed within the hollow interior of the submerged screen intake to form a reduced turbulence merged fluid flow; and
directing the reduced turbulence merged fluid flow to the single outlet.

13. The method of claim 12, wherein the first screen and the second screen each comprise a screen sidewall, a closed distal end, and an open proximal end, the open proximal end attached to one of the first or second ends of the submerged screen intake, wherein the screen sidewall is cylindrical.

14. The method of claim 12, wherein the at least one internal plate extending toward the single outlet comprises a first plate being solid and having a peripheral edge attached at least partially to an inside of a sidewall of the submerged screen intake.

15. The method of claim 14, wherein the first plate comprises a tab extending radially from the peripheral edge and disposed through the single outlet of the submerged screen intake.

16. The method of claim 15, wherein the tab extends a length into a conduit coupled to the single outlet.

17. The method of claim 12, wherein the at least one internal plate extending toward the single outlet comprises two or more plates disposed adjacent one another in the submerged screen intake, at least one of the two or more plates defining one or more openings therein.

18. The method of claim 12, wherein the at least one internal plate extending toward the single outlet comprises at least two plates disposed adjacent one another, each of the at least two plates defining one or more openings therein.

19. The method of claim 12, wherein the at least one internal plate extending toward the single outlet comprises a central plate, at least one first plate disposed adjacent one side of the central plate, and at least one second plate disposed adjacent another side of the central plate, wherein each of the at least one first and second plates defines one or more openings therein.

20. The method of claim 19, wherein the central plate also defines one or more central plate openings therein.

* * * * *